United States Patent [19]

Asano

[11] Patent Number: 4,721,969
[45] Date of Patent: Jan. 26, 1988

[54] PROCESS OF CORRECTING FOR COLOR MISREGISTERING IN ELECTROSTATIC COLOR RECORDING APPARATUS

[75] Inventor: Masashi Asano, Tokyo, Japan

[73] Assignee: Olympus Optical Company, Ltd., Tokyo, Japan

[21] Appl. No.: 861,093

[22] Filed: May 8, 1986

[30] Foreign Application Priority Data

May 28, 1985 [JP] Japan .................................. 60-115160

[51] Int. Cl.⁴ ............................................. G01D 15/10
[52] U.S. Cl. ...................................... 346/157; 358/80
[58] Field of Search ................ 346/154, 157, 1; 355/4; 358/80; 101/DIG. 13; 400/119

[56] References Cited

U.S. PATENT DOCUMENTS 3,803,628   4/1974   Van Brimer et al. ................. 346/75

Primary Examiner—Arthur G. Evans
Attorney, Agent, or Firm—Louis Weinstein

[57] ABSTRACT

A process of correcting for a color misregistering is disclosed. Markers which enable a synchronization of a record position are formed along the lateral edges of a record paper, and are read by linear sensors. The outputs from the sensors can be utilized to determine any offset of the record paper or the magnitude of any shrinkage or elongation. A processing operation is applied to a dot signal which is used in the electrostatic recording so as to remove part of the dot signal or insert a dummy dot in accordance with the result of determination. In this manner, the position where a monochromatic color signal is recorded is electrically controlled to provide a correction for a color misregistering.

4 Claims, 11 Drawing Figures

PROCESS OF CORRECTING FOR COLOR MISREGISTERING IN ELECTROSTATIC COLOR RECORDING APPARATUS

FIELD OF THE INVENTION AND RELATED ART STATEMENT

The invention relates to a process of electrically correcting for a color misregistering caused by an elongation or shrinkage of a record paper during an electrostatic recording step in an electrostatic color recording apparatus such as an electrostatic color printer in which a color record is formed by repeating a monochromatic electrostatic recording step in an area sequence a number of times corresponding to the number of the colors used.

A typical electrostatic color recording apparatus is schematically shown in FIG. 4 where a roll of electrostatic recording paper 1 is disposed on a carrier member 5 such as a drum which is mounted on a drive shaft 5a for rotation in either forward or reverse direction, with one end of the paper anchored to the carrier member. The other end of the record paper is passed around a plurality of guide rollers 6a, 6b and 6c by being pulled by a pair of vertically aligned feed rollers 6d, 6e. In this manner, a length of the record paper extends in taut condition between the location of the feed rollers 6d, 6e and the carrier member 5, and an electrostatic color recording is performed on the record paper 1 over such length.

Specifically, during an electrostatic recording step, the record paper 1 is fed along guide rollers 6a, 6b and is then pressed against a record head 2 by means of a pressure roller 7, thus allowing the step of forming an electrostatic image thereon. A latent image which is charged to the negative polarity, for example, is formed, and then the record paper is fed around the guide roller 6c to be fed to a developing and a fixing step. Both of these steps are performed by an activated one of developing/fixing heads 4a to 4d, which may be four in number as shown in the example, thus converting the latent image into a visual image.

The record head 2 is of a known construction, as illustrated in FIG. 5. As shown, the head 2 comprises an array 8 of recording pins 8a, 8b, . . . which are used to define the latent image in terms of dots. An auxiliary electrode 9 is associated with the array 8 for selecting a block of pins. Lead wires 10 and 11 are connected to the pin electrodes in the array 8 and to the auxiliary electrodes 9, respectively, for supplying a dot signal and an operating voltage. The lead wires are connected to electrical circuits, not shown. In this manner, an electrostatic latent image defined in terms of dots is formed on the electrostatic record paper 1 by means of the array of pin electrodes 8 and the auxiliary electrodes 9 of the head 2.

The developing/fixing heads 4a to 4d are also of a known construction, and FIG. 6 illustrates the construction of one of the heads, 4a. Specifically, the head includes a developer tank 13 which contains a quantity of developer 14. In the example shown, the developer 14 represents a liquid developer including a colored resin, commonly referred to as toner, dispersed in an insulating solvent, for example, Isoper G, tradename. A vacuum pump 12 is associated with the tank, and when it is operated under the condition that the record paper 1 covers and blocks developing grooves 15a to 15c and fixing grooves 16a, 16c to increase the vacuum, the developer 14 is drawn from the tank 13 to be passed through the developing grooves 15a to 15c for contact with the latent image, thus converting it into a visual image. An air stream of a high velocity is passed through the fixing grooves 16a, 16b, whereby the resulting visual image is fixed by drying, and any excess amount of developer attaching to the record paper 1 is also removed. It is to be understood that the other heads 4b to 4d are constructed in a similar manner.

When conducting a color recording operation, the described electrostatic recording step is performed for each color, and the step is repeated a number of times which corresponds to the number of colors used. For example, a color image is obtained by three or four overlapped printings. In order to prevent a color misregistering from occurring between the repeated steps and in order to enable a control over the recording timing, synchronizing marks, commonly referred to as markers, are formed on the record paper 1. By way of example, FIG. 1 shows that markers 17 are recorded on the record paper 1 at a given spacing along the opposite edges thereof, assuming that the paper travels in a direction indicated by an arrow. The markers 17 are recorded at the same time as or prior to a recording operation for the first color. A pair of position sensors 22, 23 disposed in alignment with the lateral edges of the record paper read the markers 17 recorded. Each of the position sensors 22, 23 is conventional in that it comprises an illuminating lamp 18 or 20 and a light receiving element 19 or 21.

Describing the function of the markers 17 and its recording prior to an image recording operation, the position sensors 22, 23 shown in FIG. 1 are disposed at a location 3 shown in FIG. 4. It is assumed that the developing/fixing heads 4a to 4d are effective to develop black, cyan, magenta and yellow color, respectively. Suitable means, not shown, is provided to electrically activate or deactivate the individual heads 4a to 4d. It is assumed that the record head 2 is disposed to be movable in a direction perpendicular to the plane of the drawing.

Initially, the record paper 1 is taken out of the roll, and electrostatic latent images for the markers 17 are recorded thereon by the record head 2 at an equal spacing as indicated in FIG. 1. The resulting latent images are converted into visual images by the developing/fixing head 4a. The markers 17 are recorded over a length of the record paper which corresponds to a given record size, and then the record paper 1 is once taken up or rewound upon the carrier member 5. The length of the record paper which is rewound is then payed off in order to perform a color recording for the first color or cyan component. The heads 4a, 4c and 4d are deactivated while the head 4b is activated. The position where the recording operation is initiated is determined by the timing when the leading marker 17 has passed the position sensors 22, 23 and the spacing between the location of the position sensors and the record head 2. For example, if the location of the position sensors 22, 23 is spaced 16 mm from the record head 2 and the record paper 1 travels at a rate of 2 mm/sec, it can be assured that the leading marker 17 coincides with the position where a record is to be initiated, if the recording operation is initiated at 16 mm/2 mm/sec=8 sec after the position sensors 22, 23 have produced their outputs.

If position sensors used as the sensors 22, 23 are constructed to read the positions along the X- and Y-axis, they are also capable of detecting the position in the X-axis in addition to detecting the position for the beginning of the recording operation. By way of example, the position sensors 22, 23 may be replaced each by a position sensor 26 which comprises five pairs of light emitting elements 24 and light receiving elements 25 as shown in FIG. 2. Outputs from the elements 25a to 25e when the marker 17 passes over the position sensor as indicated is shown in solid line in FIG. 3.

Accordingly, if the line position of the record paper 1 becomes offset for the second and subsequent colors, there occur changes in the output from the elements 25a to 25e. For example, if the record paper 1 is offset in the direction of the X-axis as viewed in FIG. 1, the resulting output from the elements 25a to 25e will include outputs from the elements 25c to 25e in addition to those outputs shown in solid line in FIG. 3. In this manner, by detecting which light receiving elements produce an output, an offset of the record paper 1 can be determined, thus allowing the record head to be moved by a corresponding amount when the record paper 1 reaches a given recording position. Three or four color recordings are repeated while accurately aligning the recording position in this manner, thus providing a color record.

However, recently a higher density and a higher speed of operation is required of a color recording, and a record paper of a greater size which exceeds A0-size (JIS Standards) is demanded. In other words, the record head tends to increase in size, with consequence that a head of a greater size must be driven at a higher rate and in an accurate manner. However, it is impractical to drive the record head with conventional mechanical means, and also the power dissipation required for the movement increases, resulting in an expensive apparatus.

An elongation or shrinkage of the paper has not been taken into consideration in the prior art practice, and therefore could not have been corrected. To give an example, it is recognized that for a paper of A4-size (JIS Standards), there is an elongation or shrinkage on the order of 1 to 2 mm lengthwise for a change in the relative humidity on the order of 20 to 80%. Such elongation or shrinkage obviously occurs in an electrostatic recording paper, and the greater the paper size, the greater the degree of elongation or shrinkage, which cannot be neglected in comparison to a recording density which is generally in a range from 8 dots/mm to 16 dots/mm. As an actual measurement, an elongation of about 5 mm per 1 m is observed for a change in the relative humidity from 20 to 80%. In particular, the electrostatic recording system mentioned above employs a liquid developing technique, so that after the completion of the developing step during the color recording step for the first color, the record paper is wet and allows an elongation to occur. While the paper is dried during the fixing step, it is well known that the elongation-shrinkage characteristic with respect to the humidity of a paper exhibits a hysteresis, preventing the paper from being restored to its original size. Accordingly, an apparent recording density for a second and subsequent color increases in comparison to the recording density for the first color.

As mentioned, when a color recording is to be formed in a higher density and at a higher rate, it is difficult to achieve a required movement of the recording head employing the conventional technique.

OBJECT AND SUMMARY OF THE INVENTION

It is an object of the invention to provide a process of correcting for color misregistering in an electrostatic color recording apparatus which is capable of electrically correcting for any color misregistering which may be caused by an offset in the line feed of the paper or by an elongation or shrinkage of the paper, without requiring a movement of a record head.

In a process of correcting for any color misregistering according to the invention, a record head is fixed in position while a linear sensor module is used as a position sensor. An output from the module is used to detect any offset, an elongation or shrinkage of a record paper, and a dot signal for the electrostatic recording operation is processed as by increasing or decreasing it in accordance with the result of detection so that the position where a monochromatic color signal is to be recorded can be electrically controlled, thus correcting for any color misregistering. This avoids the need for moving the recording head, thus allowing the head mechanism to be simplified and to be provided inexpensively while simultaneously improving the reliability and reducing the labor required for the maintenance.

BRIEF DESCRIPTION OF THE DRAWINGS

FIGS. 10 and 11 are for a record paper which has skewed.

DETAILED DESCRIPTION OF PREFERRED EMBODIMENTS

Figure 1:
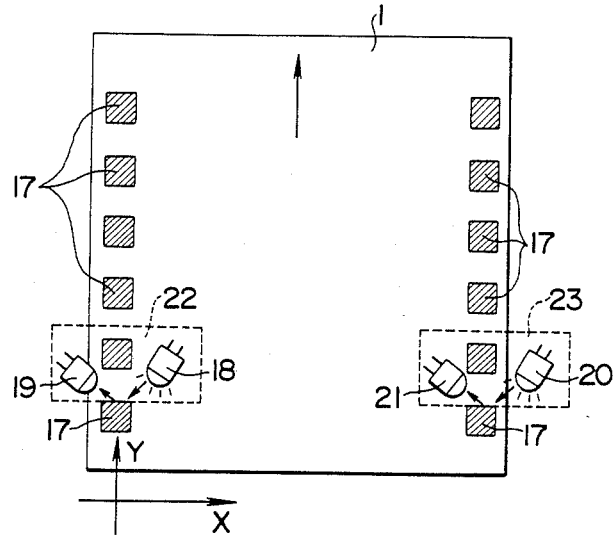
FIG. 1 is a plan view illustrating a conventional process of correcting for color misregistering.
Figure 2:
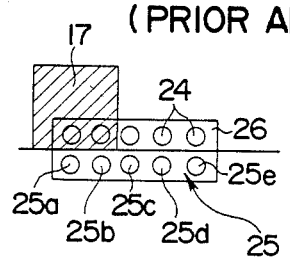
FIG. 2 is a plan view of one form of position sensor.
Figure 3:
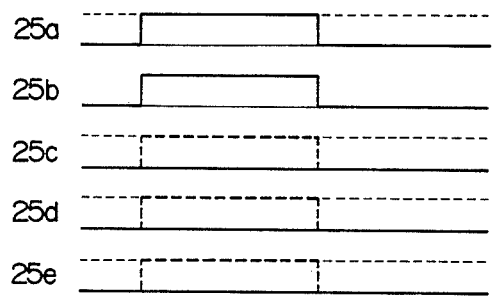
FIG. 3 graphically shows output waveforms from the position sensor of FIG. 2.
Figure 4:
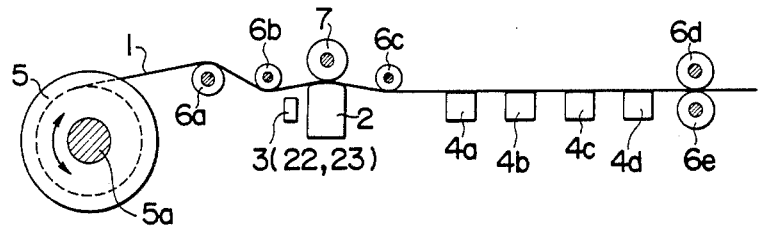
FIG. 4 is a schematic diagram illustrating an electrostatic color recording apparatus.
Figure 5:
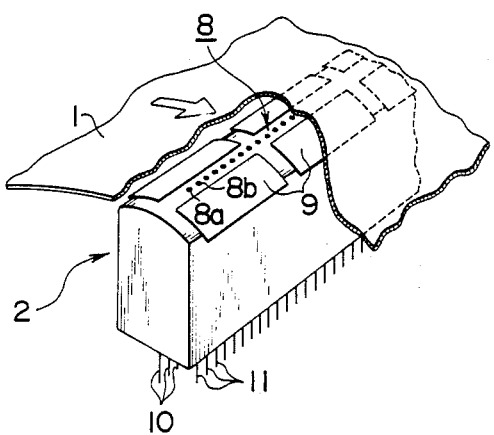
FIGS. 5 and 6 are perspective views of a record head and a developing/fixing head shown in FIG. 4.
Figure 6:
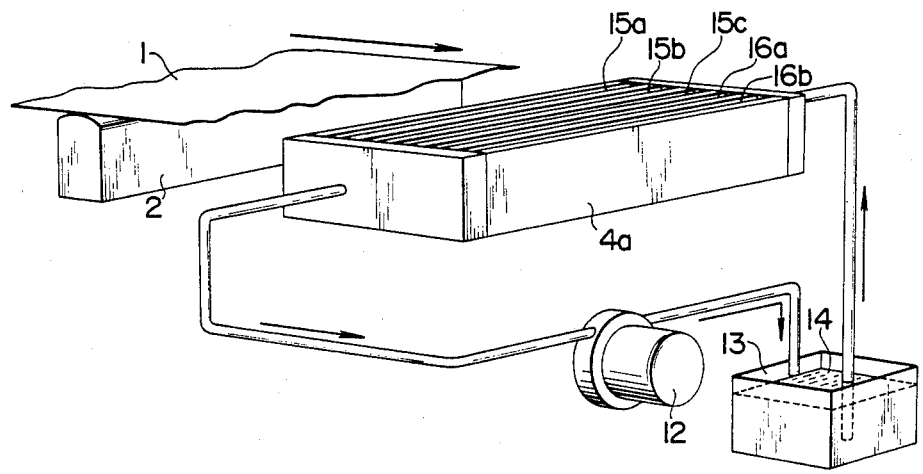
Figure 7:
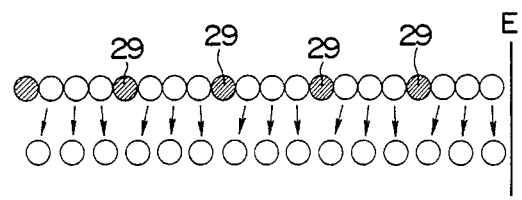
FIG. 7 is a schematic diagram illustrating the basic concept for the process of correcting according to the invention.

Initially referring to FIG. 7, the basic concept for the correcting process of the invention will be described. The illustration in FIG. 7 is for a correcting process when a color printing operation for the first color has been completed and there occurs a shrinkage in the paper as a result of processing with a liquid developer. In this instance, the shrinkage is uniform throughout the paper and hence the magnitude of shrinkage per unit length of the paper is substantially uniform. Accordingly, markers can be utilized to detect that a shrinkage has occurred in the record paper in comparison to the condition of the paper which prevails before the recording operation for the first color. Accordingly, a processing operation is performed which removes a record signal 29 for one bit from the dot signal for the second color, the bits being equally spaced apart within the dot signal. When the resulting dot signal is supplied to the head 2, the total number of dots recorded will be reduced, but the information signal to be recorded is recorded over a relatively increased area, thus correcting for a color misregistering which might otherwise result from a shrinkage in the record paper. Conversely, when there is an elongation in the record paper, an electrostatic recording operation is performed subsequent to a processing operation in which a dummy bit is inserted into the dot signal at an equal interval, the dummy signal being derived as by any desired interpolation technique. If the record paper is offset to the left or to the right, a processing operation takes place in which the dot signal is shifted a number of bits which corresponds to the magnitude of the offset in a direction from the offset before it is outputted. In this manner, a color misregistering can be corrected for without mechanically moving the record head.

Figure 8:
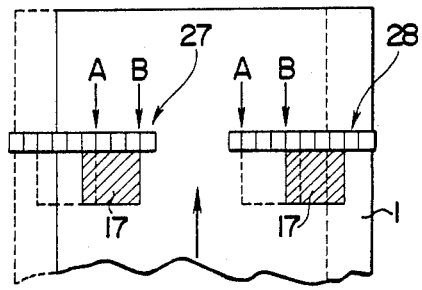
FIGS. 8 to 11 are plan views schematically illustrating several forms of implementing the correcting process of the invention; specifically FIG. 8 for a record paper which is offset, FIG. 9 for a record paper which has undergone a shrinkage.

Referring to the drawings which illustrates several embodiments, the invention will be described more specifically. In an embodiment shown in FIG. 8, linear CCD sensors are used as position sensors 27, 28, which are disposed so as to read markers 17 formed on both lateral edges of the electrostatic record paper 1. As the record paper 1 is conveyed in a direction indicated by an arrow, it is assumed for purpose of illustration that the markers 17 shown in broken lines are read by the sensors 27, 28 during a recording operation for the first color while during a recording operation for the second color, the record paper 1 is offset such that the markers shown in solid lines are read by the sensors 27, 28. In this example, a point adjacent to the edge which is nearer the longitudinal centerline of the record paper 1 will be located at point A for the first color and will be located at point B for the second color. Thus, outputs from the sensors 27, 28 can be utilized to detect the fact that the record paper 1 is offset to the right. At the same time, the magnitude of the offset is determined as corresponding to three bits of the CCD array of the sensor. To achieve color registration between the first and the second color in accordance with such result of detection, the dot signal may be shifted three bits to the right before it is outputted. Accordingly, a processing operation is performed upon the electrostatic recording dot signal which is used for the second color so that the signal is shifted three bits to the right. Conversely, if the record paper is offset to the left, the dot signal may be shifted to the left in an opposite manner.

Figure 9:
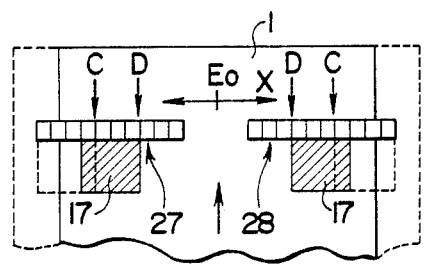

FIG. 9 shows another embodiment in which a shrinkage of the record paper 1 has occurred after a recording operation for the first color. In this instance, the record will be offset in both the direction in which the record paper is conveyed as well as in the X-direction. With a conventional approach which causes the record head to be moved to achieve a correction, it has been impossible to provide a correction in the X-direction. However, such correction is possible in accordance with the invention. Specifically, when the record paper has shrunk as indicated by a change from its broken line to its solid line position, it will be seen that a point C has been located at the end of the marker 17 before a shrinkage of the record paper 1 occurs while a point D is at the end of the marker 17 after the shrinkage. The longitudinal centerline of the record paper 1 is indicated by a line $E_0$, and it will be seen that the shrinkage of the record paper 1 in the X-direction occurs as centered about the line $E_0$.

To correct for a shrinkage in the direction in which the record paper 1 is conveyed, such shrinkage can normally be detected in terms of a number of pulses from a pulse motor which is usually used to drive the record paper. In the present instance, the marker 17 will be detected before a given number of pulses are delivered since the record paper 1 has shrunk. Accordingly, a timing is controlled such that information which is produced prior to the next marker 17 is discarded. The amount of information discarded depends on the density of the markers 17. For example, if the markers are recorded such that they have a one-to-one correspondence to the row of dots to be recorded, an offset of the record paper in the longitudinal direction or in the direction in which it is conveyed is null as is the amount of information discarded. In practice, however, a single marker is detected for several tens to several hundreds of rows of dots to be recorded. This is because of the precision of detection by the position sensor. Where the magnitude of shrinkage which would occur in the record paper can be previously predicted, information can be removed at a given proportion. Alternatively, the drive during a recording operation for one line can be changed.

When a shrinkage of the record paper 1 in the crosswise direction or in the X-direction is to be corrected, the magnitude of the shrinkage can be detected by both lateral position sensors 27, 28. Assuming that the shrinkage corresponds to 8 bits, and occurs symmetrically with respect to the centerline $E_0$, information corresponding to four bits is discarded from one side of the centerline $E_0$. To discard such information, one bit of the dot signal 29 which is disposed adjacent to the centerline $E_0$ may be removed from the row across the points $E_0$–D, which is divided into five equal sections, as illustrated in FIG. 7, since the shrinkage per unit length remains substantially constant across the record paper. This may result in a misregistering on the order of $\frac{1}{5}$ dot locally, but such order of misregistering presents no visual problem, thus providing a good correction.

On the contrary, when an elongation occurs in the record paper 1, any suitable interpolation technique may be used to insert a dummy dot at an equal interval. By way of example, if an elongation corresponding to 8 bits is detected in the X-direction as indicated in FIG. 9, the row on one side of the centerline $E_0$ may be divided into five equal sections, and one bit may be equidistantly inserted as a dummy dot. Obviously, the data inserted is used only for purpose of positioning, and need not be recorded.

Figure 10:
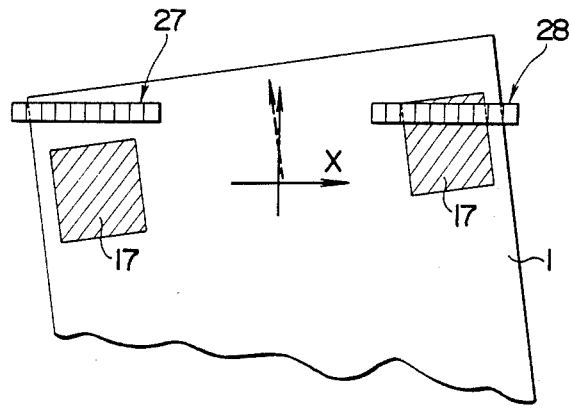
Figure 11:
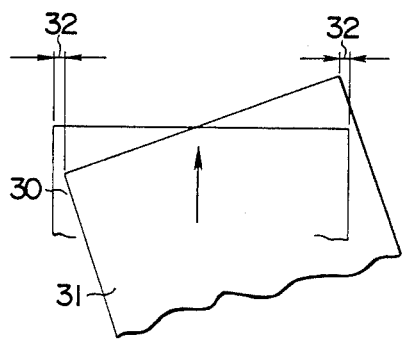

In an embodiment shown in FIG. 10, a correction for a skewed record paper is made. Assuming that the record paper 1 has skewed to the left, the outputs from the position sensors 27, 28 will be such that one of the position sensors, 28, initially reads the marker 17 to develop an output, followed by an output from the other position sensor 27 in response to the marker 17. FIG. 11 illustrates a paper position 31 of the skewed record paper 1 in comparison to a paper position 30 which is normally assumed by a record paper for a proper recording. The marker on the skewed record paper is detected in a similar manner as when the record paper has shrunk. Accordingly, for a correction of the record in the X-direction, a pseudo shrinkage 32 may be prospectively determined to effect a correction in the similar manner as occurs for the shrinkage of the record paper. For a correction in the running direction of record paper, the degree of skewing can be determined from a time interval between the outputs from the position sensors 27, 28 and the distance travelled by the record paper during such time interval. If such distance is determined to be 2 mm and assuming a recording density of 16 dot/mm, it follows that 2 mm × 16 dot/mm=32 dots represents an offset in the running direction. If the number of dots recorded in the X-direction is equal to 13,920, a raster image which approximates an original image can be obtained by renewing the row every 435 dots or 13,920/32 dots. Obviously, this correction should take place subsequent to the correction which is made from the shrinkage in the X-direction.

It is to be understood that any other technique may be available in addition to that described above. For example, if an original image is stored as a bit map in a memory, a correction can be applied to a memory area of the bit map. In addition, if an original image is stored or received as a vector memory, an offset may be added to the vector data to perform a vector-raster conversion.

While the embodiments have been described in terms of an electrostatic recording technique, it should be understood that the invention is equally applicable to any color recording including a thermo-fusion transfer, a thermo-sublimation transfer or the like.

While CCD linear sensor has been used as a position sensor, it should be understood that any physical, electrical, magnetic or optical means may be used which is capable of detecting the marker.

What is claimed is:

1. A process of correcting for a color misregistering in an electrostatic color recording apparatus including an electrostatic record head, the apparatus producing a color record by repeating a monochromatic electrostatic recording step a number of times which corresponds to the number of colors used, the monochromatic electrostatic recording step comprising forming an image to be recorded in the form of a plurality of dot signals on a record paper by using the electrostatic record head, developing and fixing a resulting electrostatic image; the process comprising the steps of successively reading markers formed on the record paper to enable a synchronization of a record position and utilizing a marker output to determine any offset of a record paper from a normal position and the magnitude of any shrinkage or elongation of the record paper in mutually perpendicular directions;

and applying a processing operation upon the dot signal which is supplied to the record head in accordance with the result determined in response to the marker output with the result determined in response to the marker output so as to add or remove a selected one or ones of the dot signal, thereby controlling the position where a dot of the monochromatic color signal is to be recorded, thus correcting for any color misregistering without the need for moving the record head.

2. A process according to claim 1 in which a plurality of markers are formed along both lateral edges of the record paper and are read by a pair of linear sensors.

3. A process according to claim 2 in which the linear sensor comprises a CCD position sensor.

4. A process according to claim 1 in which the processing operation applied to the dot signal comprises removing one bit of the dot signal at an equal interval when the record paper has shrunk crosswise or when it is skewed, and inserting a dummy dot signal at an equal interval into the dot signal when the record paper exhibits an elongation crosswise.

* * * * *